(12) United States Patent
Laitinen

(10) Patent No.: US 9,697,747 B2
(45) Date of Patent: Jul. 4, 2017

(54) TEACHING MEANS FOR MATHEMATICS

(71) Applicant: Maarit Laitinen, Tampere (FI)

(72) Inventor: Maarit Laitinen, Tampere (FI)

( * ) Notice: Subject to any disclaimer, the term of this patent is extended or adjusted under 35 U.S.C. 154(b) by 157 days.

(21) Appl. No.: 14/484,551

(22) Filed: Sep. 12, 2014

(65) Prior Publication Data

US 2015/0079556 A1  Mar. 19, 2015

(30) Foreign Application Priority Data

Sep. 13, 2013 (FI) .................... 20134194 U

(51) Int. Cl.
| | | |
|---|---|---|
| *G09B 1/00* | (2006.01) | |
| *G09B 23/02* | (2006.01) | |
| *G09B 5/02* | (2006.01) | |
| *G09B 1/40* | (2006.01) | |

(52) U.S. Cl.
CPC ............... *G09B 23/02* (2013.01); *G09B 1/40* (2013.01); *G09B 5/02* (2013.01)

(58) Field of Classification Search
USPC ............... 434/188, 191, 196, 198, 205, 207
See application file for complete search history.

(56) References Cited

U.S. PATENT DOCUMENTS

| | | | | |
|---|---|---|---|---|
| 367,223 A * | 7/1887 | Moody | ................... | G09B 19/02 283/44 |
| 1,228,889 A * | 6/1917 | Eberhart | ................ | G09B 19/02 283/44 |
| 2,748,500 A * | 6/1956 | Cormack | ............... | G09B 19/02 273/293 |
| 2,751,690 A * | 6/1956 | Cohen | ..................... | G09B 19/02 283/44 |
| 3,061,947 A * | 11/1962 | Faudree | ................ | G09B 19/02 434/205 |
| 5,954,509 A * | 9/1999 | Torres | ...................... | G09B 1/30 434/188 |
| 6,575,755 B2 * | 6/2003 | Dreyfous | ............... | G09B 19/02 434/196 |
| 7,052,279 B1 * | 5/2006 | Losq | ...................... | G09B 19/02 434/188 |
| 7,722,356 B2 * | 5/2010 | Strong | ................... | G09B 19/02 434/191 |
| D621,878 S * | 8/2010 | Weiss | ............................. | D19/59 |
| D648,392 S * | 11/2011 | Thorpe | .......................... | D19/64 |

* cited by examiner

*Primary Examiner* — Kurt Fernstrom
(74) *Attorney, Agent, or Firm* — Young & Thompson

(57) ABSTRACT

Mathematical teaching aids (100) and a method of enhancing the mathematical perception skills of a target person, preferably of practicing abductive reasoning, which teaching aids (100) include a number of teaching tiles (102), each of the teaching tiles (102) having at least one mark (104), wherein at least two teaching tiles (102), when combined, together form an identifiable pattern via the marks (104).

14 Claims, 5 Drawing Sheets

TEACHING MEANS FOR MATHEMATICS

TECHNICAL FIELD

In general, the invention relates to aids intended for teaching mathematics. In particular, the present teaching aids enhance the mathematical perception skills of a target person, preferably allowing his/her subitization range to be widened and abductive reasoning to be practiced when exercising basic counting operations.

BACKGROUND OF THE INVENTION

The concept of number is fundamental in learning mathematics. Some students still have a weak number concept at the start of the formal school mathematics. As an example, when adding small integers, the student must first figure out the numbers to be added on the fingers and, only thereafter, add them, by starting the counting all over again. What is problematic in view of learning is that a weak number concept makes it difficult for the student to see the relationships between the numbers. However, in understanding learning of mathematics, it is important to see these relationships.

Learning the basic counting skills is also an essential part of the primary school mathematics. Most of the tasks used in the teaching are productive-type tasks resulting in neither algebra-supportive learning nor abductive reasoning. Applicative tasks and problem solving may remain out of reach for a student with weak counting skills, and it can be difficult to teach application to him/her.

Abduction is a weaker form of reasoning than induction and deduction, aiming at understanding the processes related to innovation and creativity. The humans' ability to simultaneously consider many different options is regarded as the starting point for abduction. Besides, abduction is often compared to the work of a detective where retrospective thinking is used for finding out what caused the outcome. Abductive reasoning is needed in order to be capable of the application required in problem solving and, on the other hand, in the understanding-based learning of algebra.

Because of the restricted working memory capacity, the size of the subitization range is of importance in the learning as well. Subitization refers to the fast enumeration of small quantities of items without counting. As an example, the fast enumeration of dice and domino numbers is based on subitization.

The relationships between quantities may remain unclear for many persons to be taught, especially for young primary and secondary school students. Many of them may see the counting operations 3+2 and 2+3 as totally different counting operations. Many students of the last primary and secondary school grades may still add or subtract by actually folding their fingers up or down.

The basic counting operations being fundamental in any learning of mathematics, it is apparent that missing these basic skills, not understanding the relationships between numbers, presents huge difficulties for the students later on. Difficulties in a subject of instruction may have more long-term consequences affecting the student's self-esteem and thus also his/her risk of exclusion.

SUMMARY OF THE INVENTION

The objective of the invention is to alleviate the above-mentioned drawbacks related to the prior art.

In particular, the invention aims at enhancing the mathematical perception skills of a target person, preferably by practicing abductive reasoning when teaching basic counting operations. The invention also aims at widening the subitization range which, because of the restricted working memory capacity, is of importance in the learning.

The objective of the invention is achieved by the teaching aids according to claim 1. The teaching aids according to the invention are characterized in what is set forth in the characterizing part of claim 1.

According to an aspect of the invention, the mathematical teaching aids for enhancing the mathematical perception skills of a target person, preferably for practicing abductive reasoning, comprise a number of teaching tiles, each of the teaching tiles having at least one mark, wherein at least two teaching tiles, when combined, together form an identifiable pattern by means of the marks.

According to an embodiment of the invention, the teaching aids also comprise at least one teaching tile for illustration, to be put on top of the combined teachings tiles, the marks on the illustrative teaching tile corresponding to the pattern formed by the combined teaching tiles. By covering the combined teaching tiles with the illustrative tile, the marks on the illustrative teaching tile corresponding to the pattern formed by the combined teaching tiles, a clearer illustration of the relationship between the numbers is provided to the person to be taught. As an example, if first a teaching tile showing the numeric value 3 by means of marks is put on top of another teaching tile showing the numeric value 2 by means of marks, these two tiles thus forming a pattern of the numerical value 5, a clearer illustration of the relationship between the numbers 2, 3 and 5 is provided by covering the two stacked teaching tiles with an illustrative tile having a built-on pattern of the numerical value 5.

According to an embodiment of the invention, the identifiable pattern formed by the teaching tiles is a dice pattern. According to another embodiment of the invention, the identifiable pattern is a domino pattern. It is preferable to use dice and domino patterns on the teaching aids because they are easily identifiable. It is all about perceiving a numeric value pattern based on subitization, without counting. It will also be understood by a person skilled in the art that the pattern formed by means of marks is not restricted to the dice and domino patterns but can be any constellation of marks, the constellation reflecting a certain number. The identifiable pattern is preferably a plurality of marks formed into a group.

According to an embodiment of the invention, the marks on the teaching tiles with a different number of marks are of a different color.

According to an embodiment of the invention, the combined teaching tiles substantially lie on top of each other. The combined teaching tiles can also extend in the same plane, such as next to and/or within each other. According to an embodiment of the invention, the combined teaching tiles attach to each other.

According to an embodiment of the invention, the teaching tiles are at least partly transparent. The manufacturing material of the teaching tiles can be glass, plastic (such as acrylic) or any combination of these, for instance. A colored material, such as colored glass or plastic, can also be used as the material of the teaching tiles.

According to an embodiment of the invention, the teaching aids are in electronic form. The teaching tiles with their marks can be shown on a display of a computer, tablet, mobile phone or any other suitable device, for example. The person to be taught grabs the electronic teaching tiles with his/her finger, a computer mouse or any other appropriate pointer and puts the tiles on top of each other. Naturally, when in electronic form, the numeric value pattern can also be presented and moved by only using the group of marks, it therefore being not necessary to fix the marks to the relevant teaching tile, as it is for the present concrete teaching aid.

According to an embodiment of the invention, the teaching aids are useful for teaching both addition and subtraction. For addition, the teaching tiles are stacked. For subtraction, the teaching tiles are destacked.

In an aspect of the invention, a method of enhancing the mathematical perception skills of a target person, preferably for practicing abductive reasoning, by using the mathematical teaching aids according to the present invention, is provided, the method comprising at least the following steps:
  selecting a first teaching tile,
  selecting a second teaching tile,
    combining the first and the second teaching tiles to form an identifiable pattern by means of the marks on the teaching tiles.

According to an embodiment of the invention, the method also comprises the step of putting at least one illustrative teaching tile on top of said combined teaching tiles, the pattern shown by said illustrative teaching tile by means of marks then lying on the pattern formed by the two combined teaching tiles by means of marks.

According to an embodiment of the invention, the method comprises the step of separating the combined teaching from each other. The separation of the tiles from each other serves as a subtraction exercise.

The utility of the teaching aids according to the invention arises from a number of facts. According to an embodiment of the present invention, the teaching aids may allow abductive reasoning to be practiced when exercising basic counting operations. They may also widen the subitization range of the student. In addition, according to an embodiment, the teaching aids may allow the relationships between quantities to be illustrated for the student.

According to an embodiment of the invention, the aids may make it possible to quickly and accurately perceive not only the concept of number (quantity) but also the relationships between the counting operations (addition, subtraction, multiplication and division operations) and numbers. This may reduce the working memory load and allow the structures of mathematics to be taught, also at the level of expression (pre-algebra). According to an embodiment of the invention, the aids may enable this even for the weak first grade students (weak number concept and number sequence skills) while practicing addition and subtraction in the number range 0 to 10.

According to an embodiment of the invention, the student may learn to identify quantities by means of the aids, at a single glance, and thus be able to focus attention to the relationships and structures between the numbers, instead of loading the working memory by counting with number words.

According to an embodiment of the invention, the student can put the teaching tiles on top of each other when studying quantities, which may make the teachings aids a very useful tool for examining the relationships between numbers and counting operations.

According to an embodiment of the invention, the teaching aids may allow the teacher to assign the student higher-level learning tasks at the practicing stage of basic counting operations (such as proving, justifying, generalizing and so on). The higher-level learning tasks, in turn, lead to higher-level learning.

The learning process may gain depth if first the relationships between numbers and then also those between counting operations, are studied, instead of mechanical repetition (basic arithmetic).

The learning process may become lighter if the student, by understanding the relationships between numbers and by not counting with number words, reduces the load on his/her working memory.

According to an embodiment of the invention, the aids and methods may allow abductive reasoning, which is needed in order to be capable of the application required in problem solving, for example, to be practiced.

The structures based on visual observation can also be bridged to the level of expression step-by-step. An advantage of the invention is that the student may also learn to see these structures in marked expressions of the symbolic language. This may lay a foundation for algebraic reasoning already at an early stage.

The method may give the teacher a tool for teaching the practicing stage counting strategies and for guiding the student to consider the counting at a higher level of understanding.

Because, in terms of development, the learning process of the mathematical concepts often proceeds, through different stages, from the level of procedural understanding to structural understanding, the aids and methods of the present invention may allow the student to be educationally guided, already at an early stage, to consider the counting at the level of higher structural thinking.

In this application, the term "quantity" refers to any positive integer, starting from one (1), such as one, two or three.

In this application, the term "mark" refers to any visually presented sign, such as a dot, spot, circle, square, star, or a sign in any other form, by means of the shown quantity of which a certain numeric value can be reflected.

In this application, the term "numeric value" refers to any number that can be presented by means of a quantity of marks, for example.

Preferred embodiments of the invention are also disclosed in the dependent claims.

BRIEF DESCRIPTION OF THE FIGURES

In the following, preferred embodiments of the invention will be described with reference to the accompanying figures wherein.

MORE DETAILED DESCRIPTION OF THE DRAWINGS

Figure 1A:
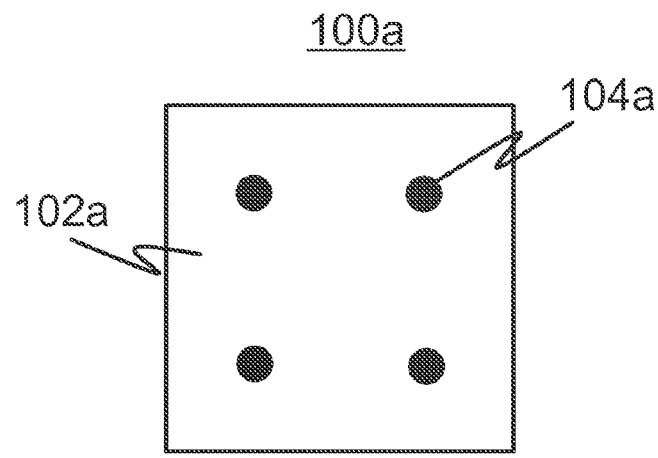
FIG. 1a is an exemplary view of a teaching aid according to an embodiment of the invention, having an exemplary pattern shown by the numeric value four by means of marks.
Figure 1B:
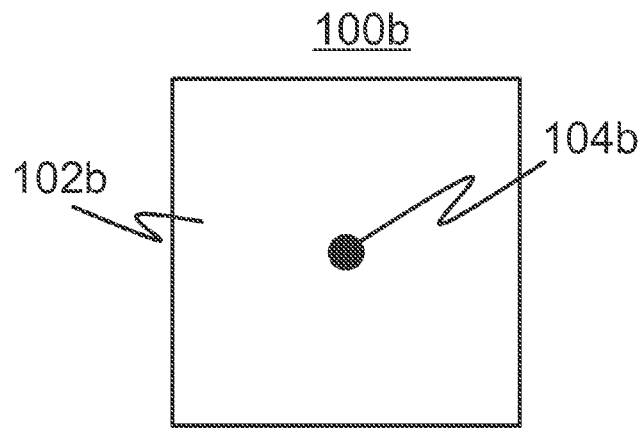
FIG. 1b is an exemplary view of a teaching aid according to an embodiment of the invention, having an exemplary pattern shown by the numeric value one by means of marks.
Figure 1C:
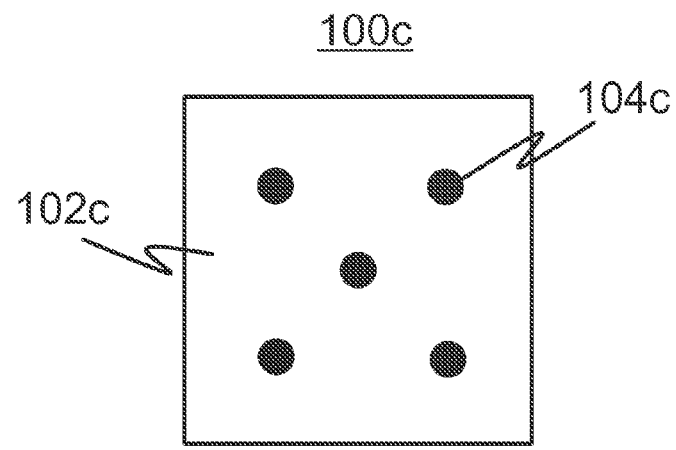
FIG. 1c is an exemplary view of a teaching aid according to an embodiment of the invention, having an exemplary pattern shown by the numeric value five by means of marks.

FIGS. 1a, 1b and 1c are exemplary views of the teaching aids 100a, 100b, 100c according to an embodiment of the present invention. The teaching aids 100a, 100b, 100c consist of teaching tiles 102a, 102b, 102c, the teaching tile 102a, 102b, 102c being provided with at least one mark 104a, 104b, 104c to reflect a certain numeric value. In FIG. 1a, a number of marks 104a form a pattern of the numeric value four (4). In FIG. 1b, a number of marks 104b form a pattern of the numeric value one (1). In FIG. 1c, a number of marks 104c form a pattern of the numeric value five (5). FIG. 1c reflects both a separate teaching aid 100c, a pattern of the numeric value five (5) being formed on the teaching aid 100c by a number of marks 104c, and the stacked teaching aids 100a, 100b of FIGS. 1a, 1b, the marks 104a, 104b of which teaching aids 100a, 100b form the pattern of the numeric value five (5) of FIG. 1c.

The following counting task example 4+1=5 is intended to illustrate how to teach basic counting operations by means of the teaching aids according to an embodiment of the present invention.

First, the person to be taught takes a first teaching tile 102a, the first teaching tile 102a having a pattern shown by the numeric value four (4) by means of marks 104a. Thereafter, the person to be taught takes a second teaching tile 102b, provided with a pattern shown by the numeric value one (1) by means of marks 104b, then putting the second teaching tile 102b on top of the first teaching tile 102a. It will be understood by a person skilled in the art that the teaching tile 102b can also be placed under the teaching tile 102a. The two stacked teaching tiles 102a, 102b form an identifiable pattern, the pattern being the dice pattern of five (5) in this example.

It will be understood by a person skilled in the art that the pattern reflecting numeric values can also be formed by more than two teaching tiles. As an example, the numeric value six (6) can be formed by three teaching tiles provided with a pattern shown by the numeric value (1), two (2) and three (3), respectively, by means of marks.

To illustrate the relationship between the numeric values four (4), one (1) and five (5) even more clearly, the person to be taught can take a third teaching tile 102c, the third teaching tile 102c being provided with a pattern shown by the numeric value five (5) by means of marks 104c, and then put the teaching tile 102c on top the two stacked teaching tiles 102a, 102b, the pattern of five (5) formed by the two stacked teaching tiles 102a, 102b then lying on the pattern of five (5) formed by the third teaching tile 102c. The person to be taught understands now, at the latest, the relationship between the numeric values four (4), one (1) and five (5).

The teaching aids 100a, 100b, 100c are at least partly transparent in order to allow the pattern formed together by the stacked teaching tiles 102a, 102b, 102c and representing a numeric value, to be seen from above the teaching tiles 102a, 102b, 102c. There are many multi-purpose materials that the teaching tiles 102a, 102b, 102c can be made of, such as plastic or glass.

The teaching tiles 102a, 102b, 102c, 202a, 202b, 202c are shaped and dimensioned to be easy to handle for the student. The following sizes are preferable for the teaching tiles 102a, 102b, 102c, 202a, 202b, 202c:

|  | preferable | more preferable | most preferable |
| --- | --- | --- | --- |
| Width: | 1 to 50 cm | 3 to 30 cm | 5 to 20 cm |
| Height: | 1 to 50 cm | 2 to 30 cm | 3 to 20 cm |
| Thickness: | 1 to 100 mm | 1 to 50 mm | 1 to 10 mm |

It will be understood by a person skilled in the art that the shape or size of the teaching tiles is not restricted to the above-mentioned ones but they can also be implemented as circular or oval tiles, for example.

The marks 104a, 104b, 104c provided on the teaching aids 100a, 100b, 100c are dissimilar from the color of the teaching tile 102a, 102b, 102c to the extent that the marks 104a, 104b, 104c are easily detectable by the human eye and that the marks 104a, 104b, 104c are visible through the second stacked teaching tile 102a, 102b, 102c. The marks 104a, 104b, 104c can be formed by paint, beads, ink, LED lights, by a combination thereof or any other suitable material. The marks can be two-dimensional such as, but not restricted to, a dot, spot, circle, square, star, or three-dimensional such as, but not restricted to, a bead, sphere. Besides, the marks can reflect different numeric values. The marks can reflect the numeric value 1 but also the numeric value 5 or 10 or 0.1 or ¼, for example. The teaching tiles and marks can also be made as separate to allow the student himself/herself to add a desired/necessary number of marks to the teaching tile.

It will also be understood by a person skilled in the art that the marks on the teaching tiles can be given different colors, this possibly leading to more effective perception of the relationships between counting operations and numbers. The marks on the teaching tiles with a different number of marks can be of a different color. As an example, the marks 104a can be of another color than the mark 104b.

Further, the markings on the teaching aids can be varied by using different marks to illustrate different numeric values. Thus, a teaching tile can comprise one or more different marks representing different number classes. It will also be understood by a person skilled in the art that tiles having marks from only one number class can be manufactured and used.

The tiles and/or the marks thereon can also be manufactured to attach to one another when put together. The tiles can be provided with magnets and/or adhesives, for example. Besides, the tiles can be made to attach the marks of a lower tile to the bottom of an upper tile, just like with Lego bricks.

Figure 2A:
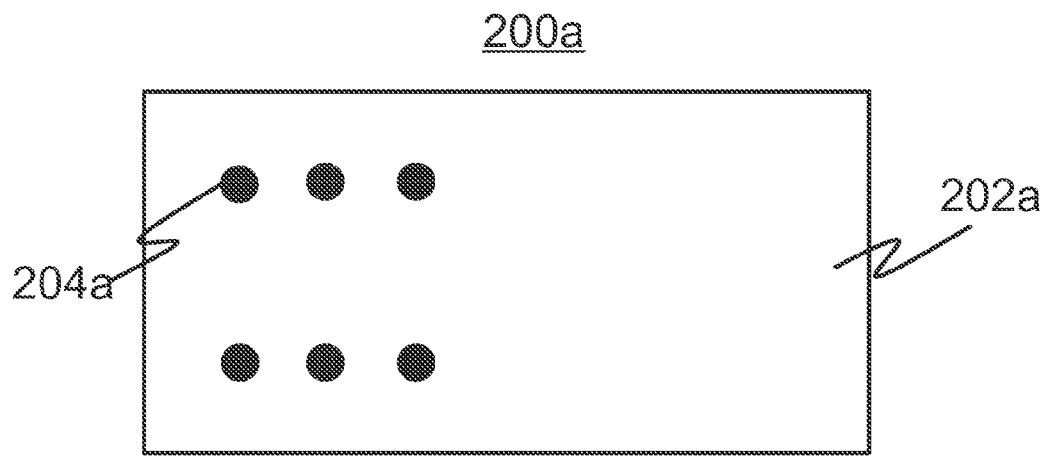
FIG. 2a is an exemplary view of a teaching aid according to an embodiment of the invention, having an exemplary pattern shown by the numeric value six by means of marks.
Figure 2B:
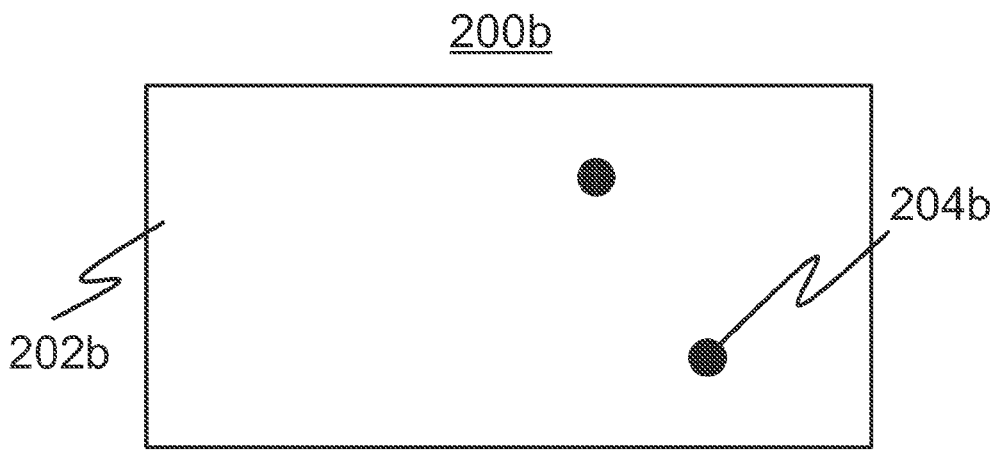
FIG. 2b is an exemplary view of a teaching aid according to an embodiment of the invention, having an exemplary pattern shown by the numeric value two by means of marks.
Figure 2C:
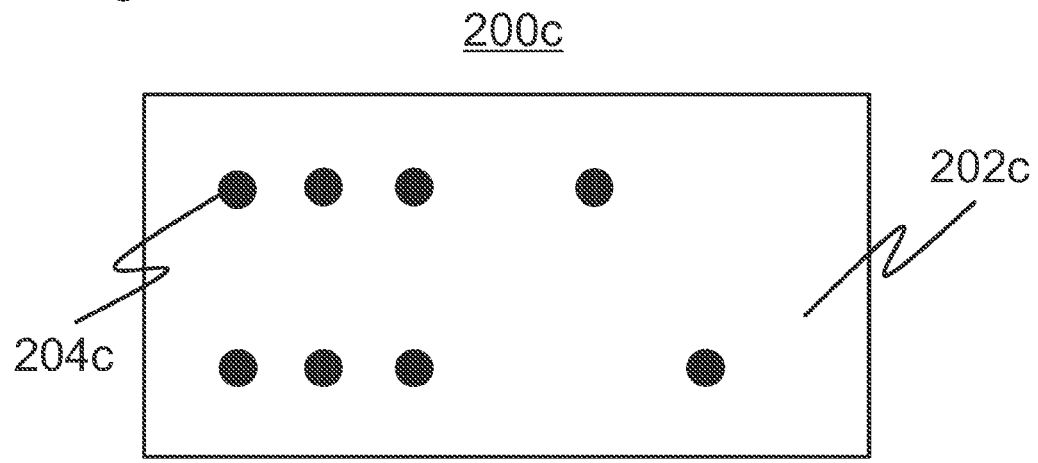
FIG. 2c is an exemplary view of a teaching aid according to an embodiment of the invention, having an exemplary pattern shown by the numeric value eight by means of marks.

FIGS. 2a, 2b, 2c are exemplary views of teaching aids 200a, 200b, 200c consisting of a teaching tile 202a, 202b, 202c and at least one mark 204a, 204b, 204c. FIGS. 2a, 2b, 2c are intended to illustrate, by an example, how to create preferable domino patterns on the present teaching aids by means of marks. However, it will be understood by a person skilled in the art that the patterns formed by means of marks are not solely restricted to the dice and domino patterns. For instance, the number five (5) can be presented as the dice pattern of five, resembling an X constellation, but also in a completely undefined order, with the marks not in an X constellation. The present teaching aids can also be used for counting operations involving numbers greater than the domino numbers, by adding marks to the teaching tiles. Because the dice pattern of five (5) is easily identifiable, it is possible to form patterns of numeric values on the teaching tiles, so as to say, "by the power of five", the dice pattern of five (5) serving as the basis for the patterns. This is illustrated on the left-side teaching tiles in FIG. 4. For instance, the numeric value seven (7) can be formed by providing, on a teaching tile 402, the dice pattern of five (5) by means of marks, and two more marks in the proximity of the dice pattern of five (5). This may help the student quickly and easily identify greater numbers (6 to 10) at a single glance.

The following counting task example 6+2=8 is intended to illustrate how to teach basic counting operations by means of the teaching aids according to another embodiment of the present invention.

First, the person to be taught takes a first teaching tile 202a, the first teaching tile 202a being provided with a pattern shown by the numeric value six (6) by means of marks 204a. Thereafter, the person to be taught takes a second teaching tile 202b, provided with a pattern shown by the numeric value two (2) by means of marks 204b, and then puts the teaching tile 202b on top of the first teaching tile 202a. The two stacked teaching tiles 202a, 202b form an identifiable pattern, the pattern being the dice pattern of eight (5) in this example. To illustrate the relationship between the numeric values six (6), two (2) and eight (8) even more clearly, the person to be taught can take a third teaching tile 202c, the third teaching tile 202c being provided with a pattern show by the numeric value eight (8) by means of marks 204c, and then put the teaching tile 202c on top of the two stacked teaching tiles 202a, 202b, the pattern of eight (8) formed by the third teaching tile 202c then lying on the pattern of eight (8) formed by the two stacked teaching tiles 202a, 202b. The person to be taught understands now, at the latest, the relationship between the numeric values six (4), two (2) and eight (8).

The teaching aids 100a, 100b, 100c, 200a, 200b, 200c also allow subtraction exercises to be carried out. Instead of stacking teaching tiles 102a, 102b, 102c, 202a, 202b, 202c on top of each other, teaching tiles 102a, 102b, 102c, 202a, 202b, 202c are destacked. With the teaching tiles 102a and 102b stacked to form the pattern of five (5), the upper teaching tile 102b is removed, the remaining teaching tile 102a thus forming the pattern of four (4). The subtraction 5−1=4 has now been carried out as an example by using the teaching aids.

Subtraction can be illustrated not only by removal but also by comparison. If it is desired to perform the subtraction 5−1 by comparing, the teaching tile 102a is brought next to the teaching tile 102c and it is examined how they differ from each other. Then, the teaching tiles 102c and 120 are put on top of each other for more effective illustration of the difference between them.

The student can also be guided to see a subtraction as an addition, i.e. what must be added to 1 to get 5.

It will be understood by a person skilled in the art that additions and subtractions can also be illustrated by stacking more than two teaching tiles on top of each other.

It will be understood by a person skilled in the art that the teaching aids of the invention also allow multiplication and division to be illustrated by stacking teaching tiles of the same numeric value on top of each other. However, the teaching tiles of the same numeric value can also consist of more than one teaching tile. For example, a multiplication illustrating the numeric value five (5) can involve only one teaching tile showing a pattern of five (5) by means of marks, two combined teaching tiles (such as 4 and 1) forming a pattern of five (5), as well as, for example, one more combination of two teaching tiles (such as 3 and 2) forming a pattern of the numeric value five (5). Now, three layers of patterns of the numeric value five (5) are stacked, illustrating the counting operation 5*3 for the student. If the marks on the teaching tiles are, for instance, three-dimensional beads, the stacked tiles form, in a lateral view of the stack, five three-bead towers, illustrating the counting operation 5*3 and thereby the commutativity of multiplication as well. Analogously, this can be reversed to illustrate the divisions 15:5 and 15:3.

It will be understood by a person skilled in the art that the present teaching aids can also be presented in electronic form. Electronic teaching materials are known from the prior art. The present teaching aids can be presented by a computer program, mobile application or in any other similar electronic way known from the prior art. As an example, the program can be browser-based or installable on a user equipment. The teaching aids can be presented by a computer, tablet, mobile phone or any other device equipped with a display, for instance. On a device with a touchscreen, the teaching aids can be moved by the finger or an appropriate pen, for instance. On a computer, the teaching aids are preferably moved by a mouse.

Figure 3:
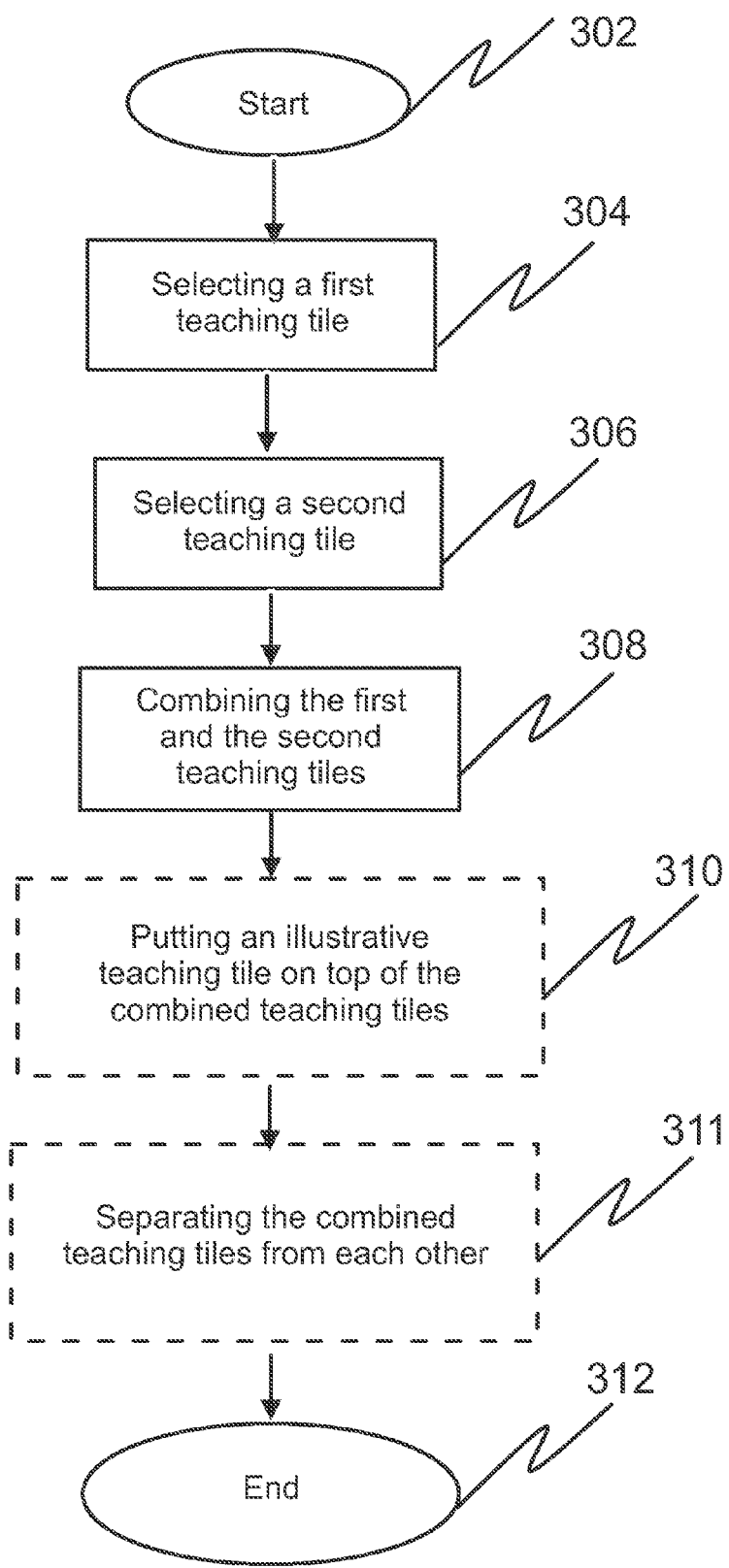
FIG. 3 is an exemplary view of a method according to an embodiment of the invention.

FIG. 3 is an exemplary view of a method according to the present invention in which the teaching aids according to the present invention are utilized.

Step 302 comprises initiating an event. If the concrete teaching aids according to the present invention are used, this step may comprise taking out the aids as well as the student and the teacher sitting down by the aids. For electronic material, instead, the preparations include starting a teaching application by an apparatus intended for exercise. As an example, the student may take a touchscreen tablet in his hands and start a teaching application according to the present invention installed on the tablet. It will also be understood by a person skilled in the art that the present step may comprise measures for installing, bringing into use and/or logging in.

Step 304 comprises selecting a first teaching tile. The student that is practicing by means of the present aids selects a first teaching tile. This can be an exercise in which the teacher asks the student to count an addition, such as 3+2. If the counting exercise is 3+2, the student picks up, in this step, a teaching tile provided with a pattern shown by the numeric value three (3) by means of marks. If electronic material is used, the student may select a pattern reflecting the numeric value three (3), by the finger, for example. It will be understood by a person skilled in the art that the electronic material may include additional illustrative features. When the student grabs the pattern reflecting the numeric value three (3), the numeric symbol 3 may appear on the display. Or, alternatively, the numeric symbol 3 can already be visible on the display, and, as the student grabs it, a pattern of the numeric value three (3) formed by marks appears.

Step 306 comprises selecting a second teaching tile. In this step, the student selects a second teaching tile for himself/herself. If the counting exercise is 3+2, as in the example above, and the student's selection in the first step was a teaching tile having the numeric value three (3), the students selects, in this step, a teaching tile provided with a pattern shown by the numeric value two (2) by means of marks. Analogously, in case of electronic material, the student selects a pattern of the numeric value two (2). The electronic material may display the numeric symbol 2 as the student grabs the pattern of the numeric value two (2). Or, alternatively, the numeric symbol 2 can already be visible on the display, and, as the student grabs it, a pattern of the numeric value two (2) formed by marks appears.

Step 308 comprises positioning the first and the second teaching tiles to partly cover each other. If, in this example, the counting operation is 3+2, the teaching tiles selected in steps 304, 306, reflecting the numeric value (2) and three (3), respectively, are stacked on top of each other. The marks on the stacked tiles form a pattern reflecting a numeric value. In the example 3+2, they form a pattern of the numeric value five (5). In case of electronic material, the patterns can be moved to each other. The electronic material may change any numeric symbols (in this example, the numeric symbols 3 and 2) into a new numeric symbol (in this example, the numeric symbol 5) as the patterns are moved to each other.

Steps 306 and 308 can be repeated for longer counting operations. In other words, more than two teaching tiles can be selected and thus more than two teaching tiles can be stacked.

Step 310 comprises putting an illustrative teaching tile on top of the teaching tiles stacked in step 308. The illustrative tile has a built-on pattern identical to the pattern that the stacked tiles form together by means of marks. As an example, if the stacked teaching tiles three (3) and two (2) form the dice pattern of five (5) by means of marks, the illustrative teaching tile comprises this constellation of marks. That is, the student picks up the illustrative teaching tile and puts it on top of the stacked teaching tiles, the marks on the illustrative teaching tile then lying on the marks on the stacked teaching tiles. In this step, at the latest, the relationship between the numbers becomes clear for the student.

Step 311 comprises separating the combined teaching tiles from each other. The separation of the tiles from each other serves as a subtraction exercise. First, the illustrative tile of step 310 is removed, or, alternatively, step 311 can precede step 310, meaning that tiles that were combined before the illustrative tile can be separated from each other.

Step 312 comprises ending the counting exercise, for example, by clearing up the tiles or turning off the electronic application. Besides, this step may comprise storing the results of the student's performance on the electronic device and/or on a server on a network for use in progress follow-up, for instance.

According to still another embodiment, the present teaching aids allow subtraction exercises to be carried out by applying the method in reverse order. When the student destacks the teaching tiles, the aids serve as teaching aids illustrating subtraction.

According to still another embodiment, the present electronic teaching aids allow subitization to be systematically used in the construction of numbers, and the visual structure to be gradually taken to the level of expression. First, patterns of numeric values formed by means of marks can be used, similarly to the example. Second, when the student grabs a pattern formed by the numeric value three (3) by means of marks, the numeric symbol 3 also appears, and when the student grabs a pattern formed by the numeric value two (2) by means of marks, the numeric symbol 2 also appears, and, when these patterns formed by the numeric values by means of marks are combined, a pattern formed by the numeric value five (5) as well as the numeric symbol 5 appear. Third, when the student grabs the numeric symbol 3, a pattern formed by the numeric value three (3) by means of marks appears, and when the student grabs the numeric symbol 2, a pattern formed by the numeric value two (2) by means of marks appears, and, when these are combined, the numeric symbol 5 as well as a pattern formed by the numeric value five (5) by means of marks appear. Fourth, only the numeric symbols are used. When the student grabs the numeric symbol 3 and combines it with the numeric symbol 2, the numeric symbol 5 appears.

Figure 4:
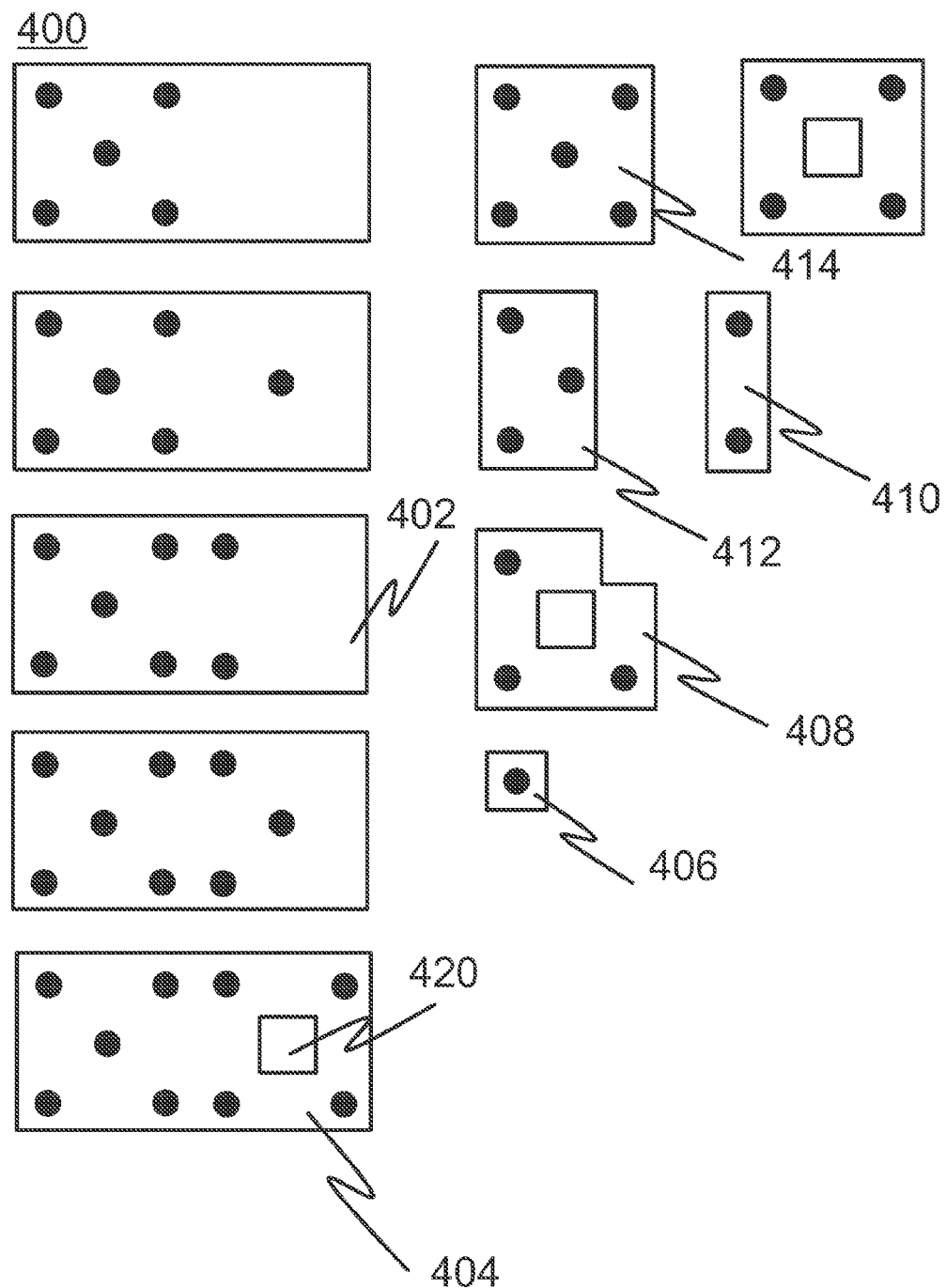
FIG. 4 is an exemplary view of the teaching tiles according to an embodiment of the invention which also can be placed within and/or next to each other.

FIG. 4 shows teaching aids 400 that can also be placed within and/or next to each other. As an example, the teaching tile 404 has an opening 420 into which the teaching tile 406 can be inserted. The teaching tile 408 has a cut-off corner capable of receiving the teaching tile 406. The teaching tiles 410 and 412 can be placed next to each other to form the pattern of the teaching tile 414. The teaching tiles can also be stacked.

Figure 5:
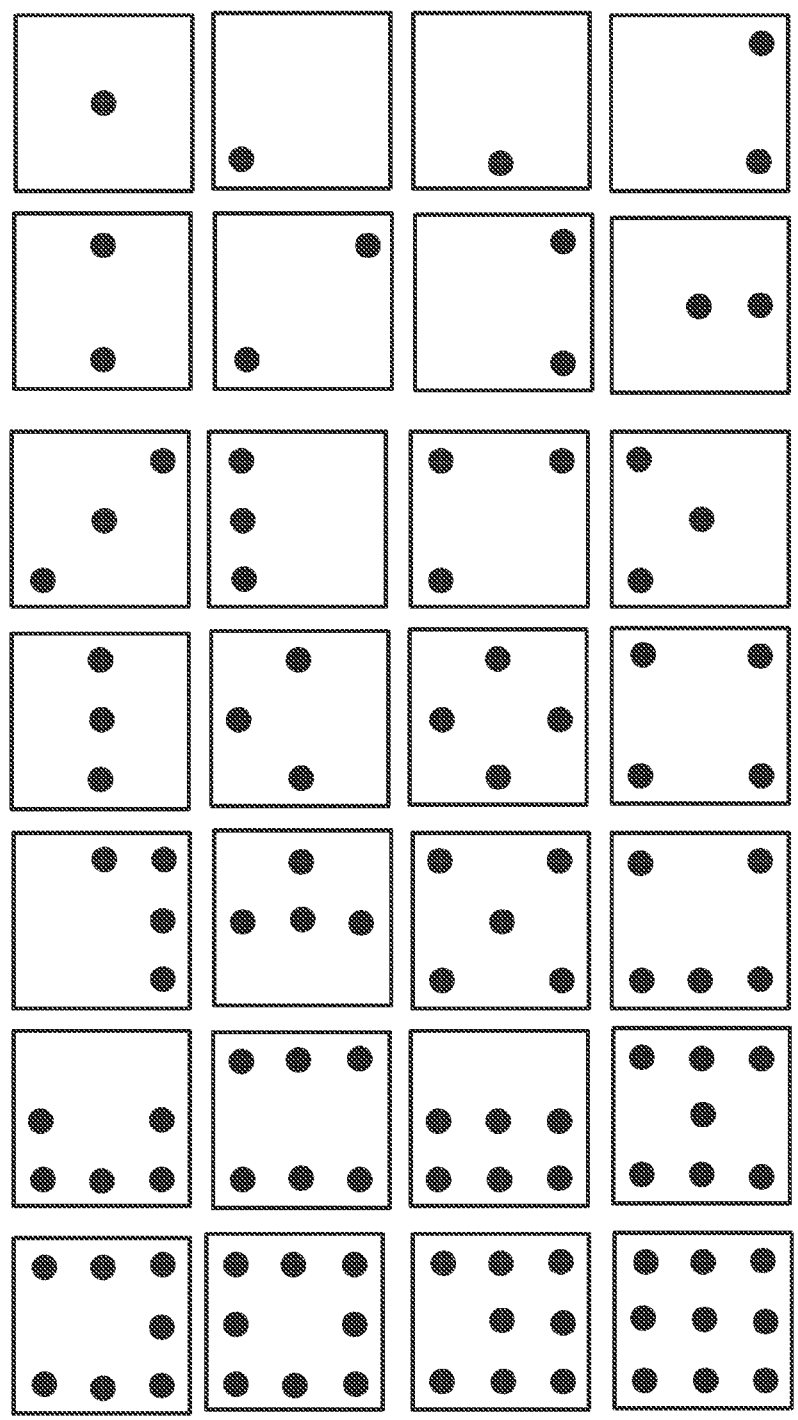
FIG. 5 is an exemplary view of the teaching aids according to an embodiment of the invention, teaching aids comprising some patterns of the numbers 1 to 9.

FIG. 5 shows the teaching aids 500, these teaching aids comprising some of the patterns of the numbers from 1 to 9. The teaching aids can be manufactured to only allow certain teaching tiles to be combined with certain teaching tiles, if, for example, it is desired that the pattern formed by the two combined teaching tiles is a certain pattern, such as a dice or domino pattern. Similarly, in some embodiments, the teaching tiles can only be combined with each other in a certain direction. In some embodiments, the pattern formed by the two or more teaching tiles is some other grouped quantity of marks than a dice or domino pattern.

The scope of the invention is defined by the accompanying claims. However, it will be understood by a person skilled in the art that the details of the different features of the invention may vary to some extent within the idea of the invention, depending on the embodiment of the invention.

The invention claimed is:

1. Mathematical teaching aids (100) for enhancing the mathematical perception skills of a target person and/or for practicing abductive reasoning, the mathematical teaching aids (100) comprising:
    a number of teaching tiles (102), each of the teaching tiles (102) having at least one mark (104),
    at least two of the teaching tiles (102), when combined, together forming an identifiable pattern by means of the marks (104); and
    at least one illustrative teaching tile to be put on top of said combined teaching tiles (102), the marks on the illustrative teaching tile corresponding to the identifiable pattern formed by the marks of the combined teaching tiles.

2. The teaching aids as defined in claim 1, wherein the marks on the teaching tiles with a different number of marks are of a different color.

3. The teaching aids as defined in claim 1, wherein said combined teaching tiles substantially lie on top of each other.

4. The teaching aids as defined in claim 1, wherein said combined teaching tiles substantially extend in the same plane.

5. The teaching aids as defined in claim 1, wherein the combined teaching tiles attach to each other.

6. The teaching aids as defined in claim 1, wherein the pattern is a dice pattern.

7. The teaching aids as defined in claim 1, wherein the pattern is a domino pattern.

8. The teaching aids as defined in claim 1, wherein at least one of said combined teaching tiles comprises the dice pattern of five.

9. The teaching aids as defined in claim 1, wherein the teaching tiles are at least partly transparent.

10. The teaching aids as defined in claim 1, wherein the manufacturing material of the teaching tiles is selected from the group consisting of glass, plastic, and any combination of glass and plastic.

11. The teaching aids as defined in claim 1, wherein the marks on the illustrative teaching tile form a pattern identical to the identifiable pattern formed by the marks of the combined teaching tiles.

12. A method of enhancing the mathematical perception skills of a target person and/or for practicing abductive reasoning, the method comprising at least the following steps:

selecting a first teaching tile;

selecting a second teaching tile; and combining the first and the second teaching tiles to form an identifiable pattern by means of marks on the first and second teaching tiles; and placing an illustrative teaching tile on top of said combined teaching tiles, the marks shown by said illustrative teaching tile corresponding to the identifiable pattern formed by the marks of the two combined teaching tiles, such that a pattern of the marks shown by said illustrative teaching tile lies on the identifiable pattern formed by the marks of the combined first and second teaching tiles.

13. The method as defined in claim 12, wherein the pattern of the marks shown by said illustrative teaching tile is identical to the identifiable pattern formed by the marks of the combined first and second teaching tiles.

14. The method as defined in claim 12, wherein the combined teaching tiles are separated from each other.

* * * * *